United States Patent
Gangi et al.

(10) Patent No.: US 11,431,213 B2
(45) Date of Patent: Aug. 30, 2022

(54) ROTARY ELECTRIC MACHINE

(71) Applicant: TOYOTA JIDOSHA KABUSHIKI KAISHA, Toyota (JP)

(72) Inventors: Suguru Gangi, Toyota (JP); Shinya Sano, Toyota (JP); Yasuhide Yagyu, Nagakute (JP); Takanori Kadota, Toyota (JP); Keiji Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/751,275

(22) Filed: Jan. 24, 2020

(65) Prior Publication Data

US 2020/0259377 A1 Aug. 13, 2020

(30) Foreign Application Priority Data

Feb. 12, 2019 (JP) .............................. JP2019-022940

(51) Int. Cl.
*H02K 1/27* (2022.01)
*H02K 1/276* (2022.01)

(52) U.S. Cl.
CPC .................................. *H02K 1/2766* (2013.01)

(58) Field of Classification Search
CPC ........................ H02K 1/2766; H02K 2213/03
See application file for complete search history.

(56) References Cited

U.S. PATENT DOCUMENTS

| 2014/0091664 A1 | 4/2014 | Aoyama |
| 2017/0338707 A1* | 11/2017 | Shono .................. H02K 1/2766 |
| 2018/0145552 A1* | 5/2018 | Hattori ................. H02K 1/2766 |
| 2020/0044501 A1* | 2/2020 | Matsubara ............ H02K 29/03 |

FOREIGN PATENT DOCUMENTS

| CN | 103715801 A | 4/2014 |
| CN | 108075585 A | 5/2018 |
| JP | 2006-314152 A | 11/2006 |
| JP | 2011-229395 A | 11/2011 |

* cited by examiner

*Primary Examiner* — Thomas Truong
(74) *Attorney, Agent, or Firm* — Oblon, McClelland, Maier & Neustadt, L.L.P.

(57) ABSTRACT

A rotor has a plurality of magnetic poles aligned in a circumferential direction, each magnetic pole includes a first magnet equipment portion and a second magnet equipment portion positioned more toward an inner circumferential side than the first magnet equipment portion, the second magnet equipment portion has a pair of inner magnet holes placed symmetrically with respect to a center of the magnetic pole, and one or more inner magnets equipped in each of the inner magnet holes, each inner magnet hole has a bent line shape with one or more points of bending in an axial direction view, and an end, on a center side in a circumferential side of the magnetic pole, of the inner magnet hole is expanded on both sides in a thickness direction thereof, and functions as a magnetic barrier having a larger thickness than the inner magnet.

5 Claims, 8 Drawing Sheets

ROTARY ELECTRIC MACHINE

CROSS REFERENCE TO RELATED APPLICATION

This application claims priority to Japanese Patent Application No. 2019-22940 filed on Feb. 12, 2019, which is incorporated herein by reference in its entirety including the specification, claims, drawings, and abstract.

TECHNICAL FIELD

The present disclosure relates to a rotary electric machine which has a stator having a circular tube shape and a rotor which is placed at an inner side of and coaxially with the stator.

BACKGROUND

In a rotary electric machine of an embedded magnet type in which a permanent magnet is embedded in a rotor core to form a magnetic pole, a combined torque is output, which is a combined torque of a magnet torque generated by the permanent magnet and a reluctance torque generated based on a magnetic anisotropy of the rotor core. In order to increase this output torque, in the related art, a technique has been proposed in which the permanent magnets are placed in two layers along a radial direction.

For example, JP 2011-229395 A and JP 2006-314152 A disclose a motor in which an outer flux barrier (outer magnet hole) is placed near an outer surface of a rotor, a pair of inner flux barriers (inner magnet holes) are placed in an approximate V shape at an inner side, in the radial direction, of the outer flux barrier, and permanent magnets are placed respectively in the flux barriers. In addition, in JP 2011-229395 A and JP 2006-314152 A, the inner flux barrier is bent at a midway point. The output torque can be increased by placing the permanent magnets in two layers in the radial direction as in JP 2011-229395 A and JP 2006-314152 A.

However, in the techniques of JP 2011-229395 A and JP 2006-314152 A, an end, on a center side of the magnetic pole, of the inner flux barrier has a relatively simple shape. Because of this, a magnetic path distance for a leakage magnetic flux from one inner magnet through a bridge portion and returning to the one inner magnet tends to be short. In this case, the leakage magnetic flux which does not contribute to generation of the torque tends to become large, which consequently results in reduction of the output torque of the rotary electric machine.

An advantage of the present disclosure lies in provision of a rotary electric machine which can further improve the output torque.

SUMMARY

According to one aspect of the present disclosure, there is provided a rotary electric machine comprising: a stator having an approximate circular tube shape; and a rotor that is placed at an inner side of and coaxially with the stator, wherein the rotor comprises a plurality of magnetic poles aligned in a circumferential direction, each magnetic pole includes a first magnet equipment portion and a second magnet equipment portion positioned more toward an inner circumferential side than the first magnet equipment portion, the second magnet equipment portion has a pair of inner magnet poles placed symmetrically with respect to a center of the magnetic pole, and one or more inner magnets equipped in each of the inner magnet holes, each inner magnet hole has a bent line shape with one or more points of bending in an axial direction view, and an end, on a center side in a circumferential direction of the magnetic pole, of the inner magnet hole is expanded on both sides in a thickness direction thereof, and functions as a magnetic barrier having a larger thickness than the inner magnet.

By providing the magnetic barrier expanded on both sides in the thickness direction, a magnetic path distance of the leakage magnetic flux from the inner magnet through the bridge portion and returning to the inner magnet can be elongated, and the leakage magnetic flux can be efficiently suppressed. As a result, the output torque can be further improved.

According to another aspect of the present disclosure, a width of a magnetic path between the first magnet equipment portion and the second magnet equipment portion may be widened from an end thereof toward the center of the magnetic pole.

With the above-described structure, the magnetic path width near the center of the magnetic pole where a primary magnetic flux and a magnet magnetic flux tend to be parallel to each other can be widened, and magnetic saturation can be efficiently prevented. With this configuration, the output torque of the rotary electric machine can be further improved.

According to another aspect of the present disclosure, the inner magnet hole may have a center-side portion which is at a side nearer to the center of the magnetic pole than the point of bending, and an outer-side portion which is further out than the point of bending, and an inclination angle between the center-side portion and a d axis may be larger than an inclination angle between the outer-side portion and the d axis.

With the above-described structure, it is possible to prevent an excessive increase in the distance between the inner magnet and the outer magnet near the center of the magnetic pole. Consequently, with this configuration, the reduction of the magnet magnetic flux can be more efficiently prevented, and the output torque of the rotary electric machine can be further improved.

According to another aspect of the present disclosure, the inner magnet may be equipped on both sides of the point of bending in the inner magnet hole.

With the above-described structure, a total amount of magnet, and, consequently, a total amount of magnet magnetic flux, can be increased, and thus, the magnet torque, and, consequently, the output torque of the rotary electric machine, can be improved.

According to another aspect of the present disclosure, the inner magnet may be equipped at a position distanced from the point of bending.

By placing the inner magnet avoiding the point of bending where a counter magnetic field tends to be concentrated, the magnet magnetic flux can be more efficiently utilized.

According to another aspect of the present disclosure, the first magnet equipment portion may include one or more outer magnet holes, and one or more outer magnets equipped in each of the outer magnet holes, and all of the outer magnets and the inner magnets may have the same shape.

With the above-described structure, a number of types of magnets can be reduced, and manufacturing cost and management cost of components can be reduced.

According to the rotary electric machine of various aspects of the present disclosure, because the leakage magnetic flux is efficiently suppressed, the output torque of the rotary electric machine can be further improved.

BRIEF DESCRIPTION OF DRAWINGS

Embodiment(s) of the present disclosure will be described based on the following figures, wherein.

DESCRIPTION OF EMBODIMENTS

Figure 1:
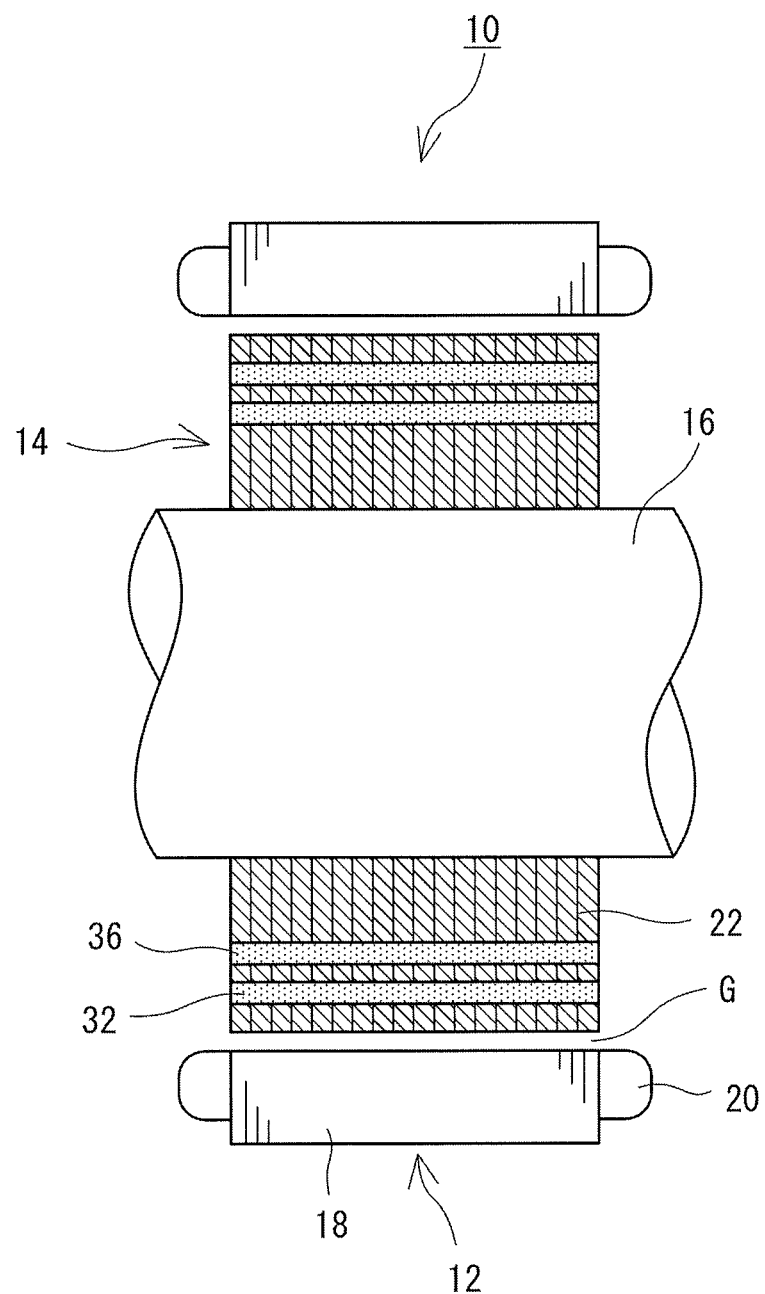
FIG. 1 is a vertical cross sectional diagram schematically showing a rotary electric machine.
Figure 2:
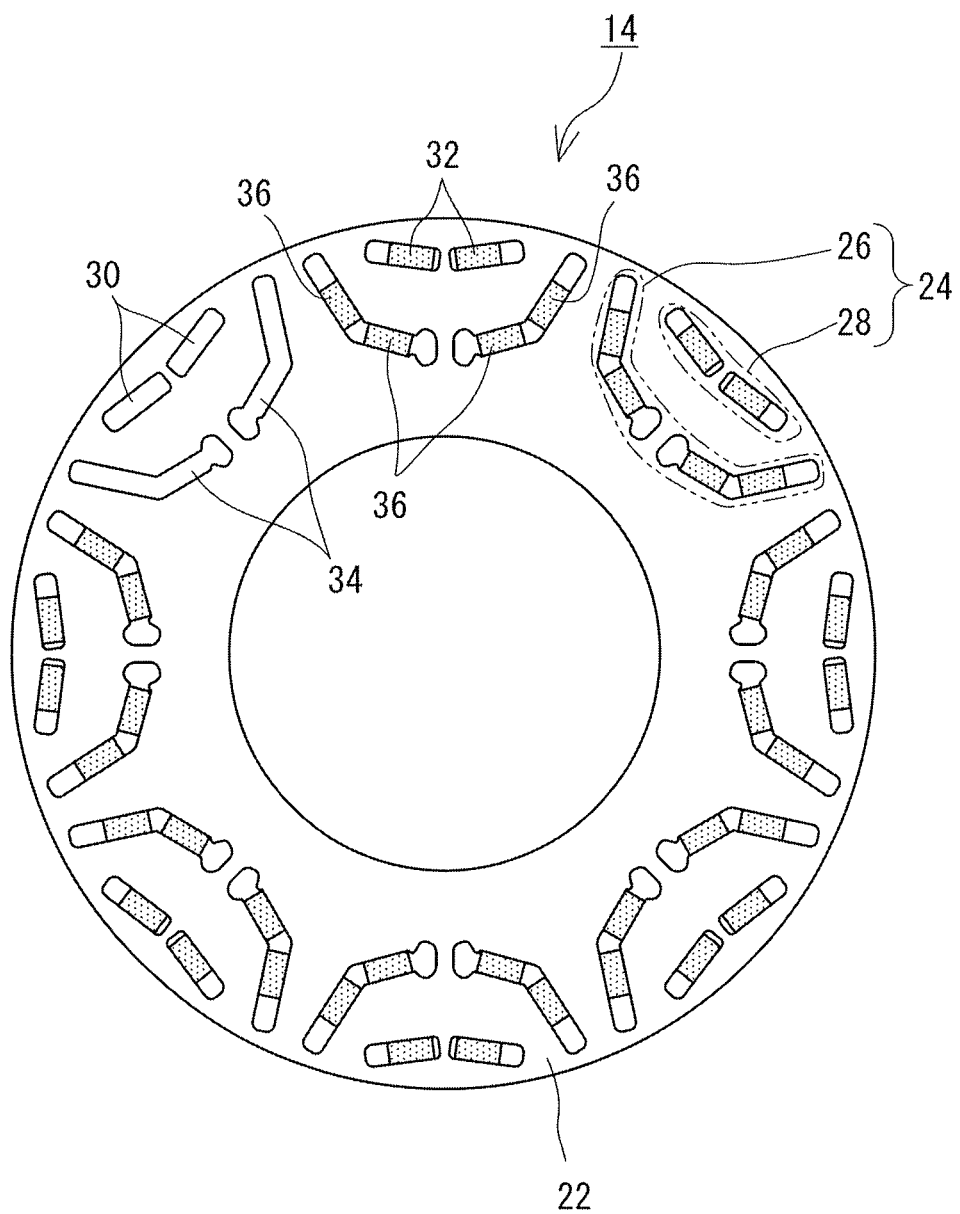
FIG. 2 is a lateral cross sectional diagram of a rotor.
Figure 3:
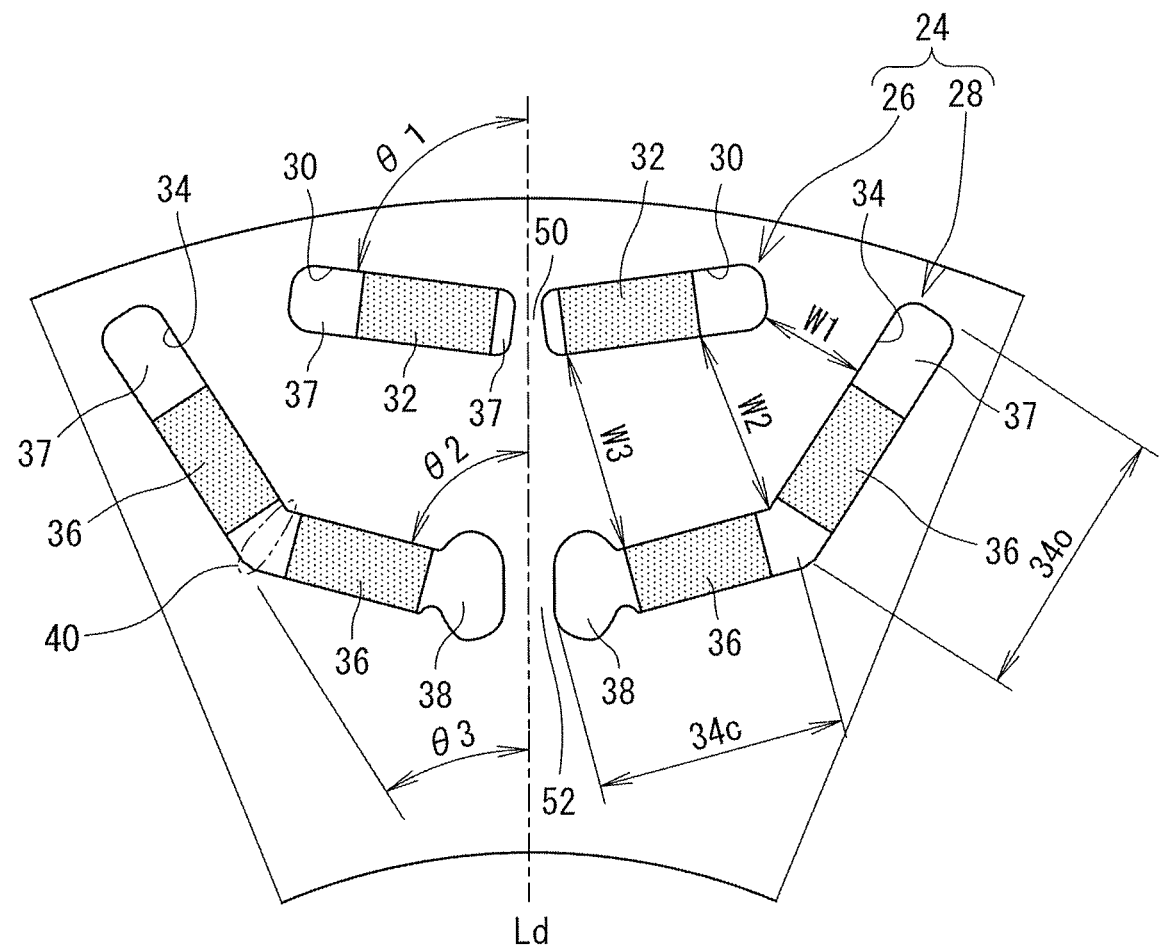
FIG. 3 is an enlarged view of a periphery of one magnetic pole.

A structure of a rotary electric machine 10 will now be described with reference to the drawings. FIG. 1 is a vertical cross sectional diagram schematically showing the rotary electric machine 10. FIG. 2 is a lateral cross sectional diagram of a rotor 14, and FIG. 3 is an enlarged view of a periphery of one magnetic pole 24. In FIG. 2, in order to facilitate viewing of a shape of a magnet hole, illustration of a magnet in one magnetic pole 24 is omitted. In addition, in the following description, an "axial direction", a "radial direction", and a "circumferential direction" respectively refer to a rotor axis direction, a rotor radial direction, and a rotor circumferential direction.

The rotary electric machine 10 is a permanent magnet synchronous rotary electric machine in which permanent magnets 32 and 36 are embedded inside a rotor core 22. The rotary electric machine 10 may be mounted, for example, on an electricity-driven vehicle as a traveling power source. The rotary electric machine 10 comprises a stator 12 having an approximately circular tube shape, the rotor 14 which is placed at an inner side of and coaxially with the stator 12, and a rotational shaft 16 fixed to a center of the rotor 14. The stator 12 includes a stator core 18 having an approximately circular tube shape and on an inner circumference of which a plurality of teeth are formed, and a stator coil 20 wound around each tooth. The rotor 14 is placed at an inner side of the stator 12, and coaxially with the stator 12. A gap G of an approximately uniform distance exists between an outer circumferential surface of the rotor 14 and an inner circumferential surface of the stator 12.

The rotor 14 has a rotor core 22 having an approximately circular tube shape, and the magnetic poles 24 formed by permanent magnets 32 and 36 embedded in the rotor core 22. The rotational shaft 16 is fixed at a center of the rotor core 22. The rotational shaft 16 is supported by a bearing (not shown), and rotates with the rotor 14.

In the rotor 14, an even number (in the exemplified configuration of the FIG. 8) of magnetic poles 24 are provided arranged with equal spacing therebetween in the circumferential direction. Polarities of the even number of magnetic poles 24 are alternately reversed in the circumferential direction. One magnetic pole 24 is formed by a plurality of (in the exemplified configuration of the FIG. 6) permanent magnets 32 and 36 equipped in a plurality (in the exemplified configuration of the FIG. 4) of magnet holes 30 and 34. This configuration will now be described with reference to FIG. 3.

Each magnetic pole 24 has a two-layer structure including a first magnet equipment portion 26 and a second magnet equipment portion 28 provided more toward an inner side in the radial direction than the first magnet equipment portion 26. The first magnet equipment portion 26 is provided near an outer circumferential edge of the rotor 14, and has a pair of outer magnet holes 30 placed symmetrically with respect to a center of the magnetic pole (that is, a d axis Ld), and an outer magnet 32 equipped in each outer magnet hole 30. The outer magnet hole 30 is a hole which penetrates through the rotor core 22 in the axial direction, and has an approximately rectangular outer shape which is long in one direction in an axial direction view. Each outer magnet hole 30 is placed inclined at a predetermined inclination angle $\theta 1$ ($\theta 1 < 90°$) with respect to the d axis Ld. With this configuration, two outer magnet holes 30 form an approximate V shape opened toward an outer side in the radial direction, as shown in FIG. 3. An outer center bridge 50 which is a part of the rotor core 22 is interposed between two outer magnet holes 30.

One outer magnet 32 is equipped in each outer magnet hole 30. Similar to the outer magnet hole 30, the outer magnet 32 has an approximately rectangular outer shape in the axial direction view. In addition, the outer magnet 32 is magnetized in its thickness direction (short-axis direction). A size of the outer magnet 32 in a width direction (long-axis direction) is sufficiently smaller than a size, in the width direction, of the outer magnet hole 30. Because of this, when the outer magnet 32 is equipped in the outer magnet hole 30, a space is formed on both sides in the width direction of the outer magnet 32. This space functions as a flux barrier 37 which blocks flow of the magnetic flux. A thickness of the flux barrier 37 is approximately the same as a thickness of the outer magnet 32.

The second magnet equipment portion 28 is provided at an inner side in the radial direction of the first magnet equipment portion 26, and has a pair of inner magnet holes 34, and a plurality of inner magnets 36 equipped in the inner magnet hole 34. The pair of the inner magnet holes 34 are placed symmetrically with respect to the d axis Ld so as to form an approximate V shape or an approximate U shape opened toward the outer side in the radial direction. Similar to the outer magnet hole 30, the inner magnet hole 34 is also a hole penetrating through the rotor core 22 in the axial direction. However, the inner magnet hole 34 has an outer shape of a bent line shape with one or more points of bending 40 in an axial direction view. More specifically, the inner magnet hole 34 of the present embodiment has an approximately V shaped outer shape including a center-side portion 34c extending from the point of bending 40 toward a center side of the magnetic pole 24, and an outer-side portion 34o extending from the point of bending 40 toward an outer circumferential edge of the rotor 14.

As will be described later, a region between the first magnet equipment portion 26 and the second magnet equipment portion 28 is a magnetic path through which a magnetic flux flows. In the present embodiment, the shape of the inner magnet hole 34 is set so that widths W1, W2, and W3 of the magnetic path are increased toward the center of the magnetic pole (d axis Ld). Specifically, an inclination angle $\theta 2$ of the center-side portion 34c with respect to the d axis Ld and an inclination angle $\theta 3$ of the outer-side portion 34o are set to be larger than the inclination angle $\theta 1$ of the outer magnet hole 30. In addition, in the present embodiment, the inclination angle $\theta 2$ is further set to be larger than the inclination angle $\theta 3$. In other words, a relationship of $\theta 1 > \theta 2 > \theta 3$ holds true. The reason for employing this structure will be described later.

In the inner magnet hole 34, two inner magnets 36 are equipped. The two inner magnets 36 are placed on both sides of and sandwiching the point of bending 40. That is, one inner magnet 36 is equipped in each of the center-side portion 34 and the outer-side portion 34o of the inner magnet hole 34. Similar to the outer magnet 32, the inner magnet 36 has an approximately rectangular outer shape in the axial direction view, and is magnetized in its thickness direction (short-axis direction). In the present embodiment, magnets of the same type and the same shape are used for all of the inner magnets 36 and the outer magnets 32. With such a configuration, the number of types of magnets can be reduced, and the manufacturing cost of the rotor 14 can further be reduced.

As is clear from FIG. 3, the inner magnet 36 is equipped avoiding the point of bending 40, and an end in the width direction of the inner magnet 36 is distanced from the point of bending 40. This configuration is employed in order to avoid a counter magnetic field applied to the inner magnet 36. This will be described later in detail.

In addition, in the present embodiment, the size in the width direction of the center-side portion 34c and the size in the width direction of the outer-side portion 34o are sufficiently larger than the size in the width direction of the inner magnet 36. Because of this, a space is formed in which there is no magnet, on both ends of the inner magnet hole 34. This space functions as a flux barrier 37 which blocks the flow of the magnetic flux. As shown in FIG. 3, of these barriers, the flux barrier at the center side of the magnetic pole is expanded to both sides in the thickness direction of the inner magnet hole 34, and has a larger thickness than the inner magnet 36. The flux barrier expanded on both sides in the thickness direction will hereinafter be called a "magnetic barrier 38", and will be distinguished from the other flux barriers 37. With the provision of the magnetic barrier 38, a leakage magnetic flux 49 (refer to FIG. 5) which does not contribute to the torque output can be suppressed, and the output torque of the rotary electric machine 10 can be further improved.

Figure 4:
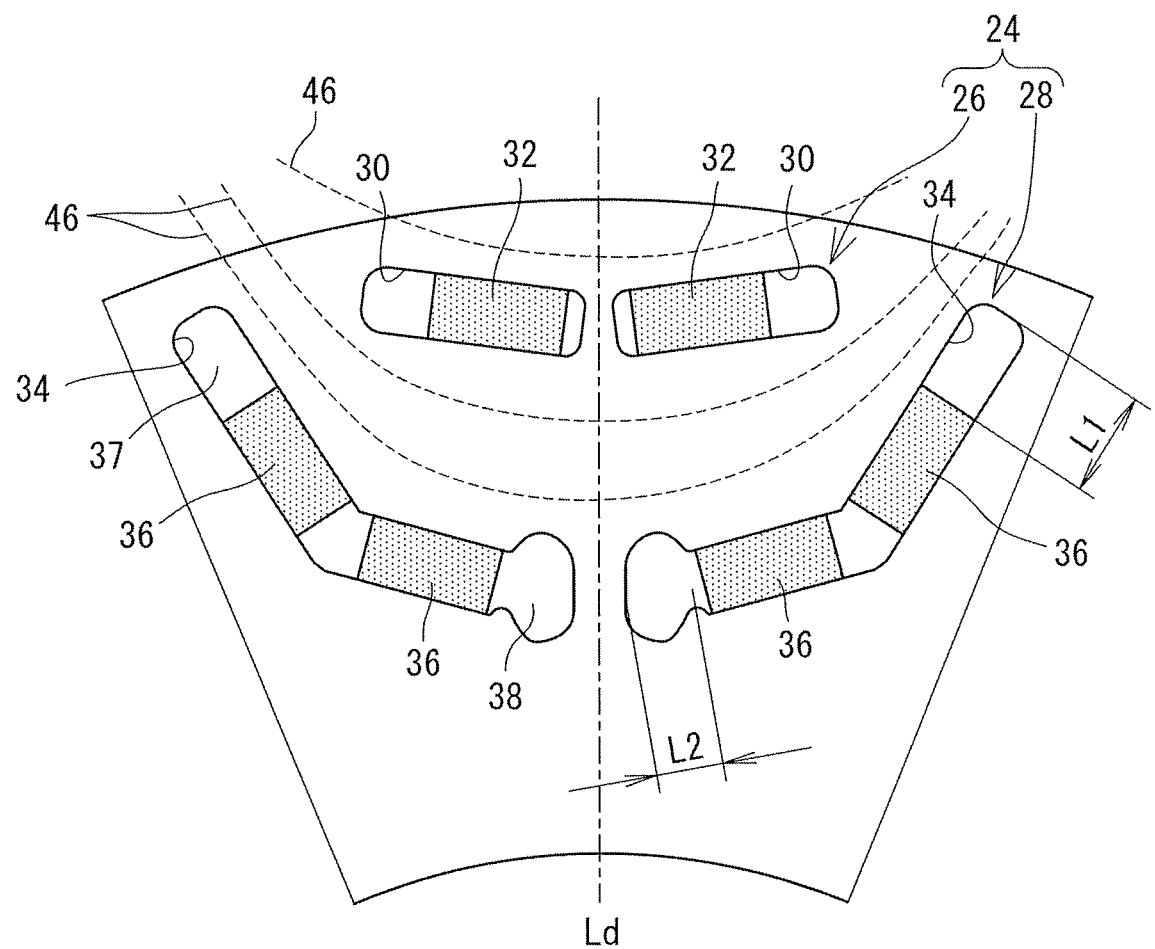
FIG. 4 is a schematic diagram showing a flow of a primary magnetic flux.
Figure 5:
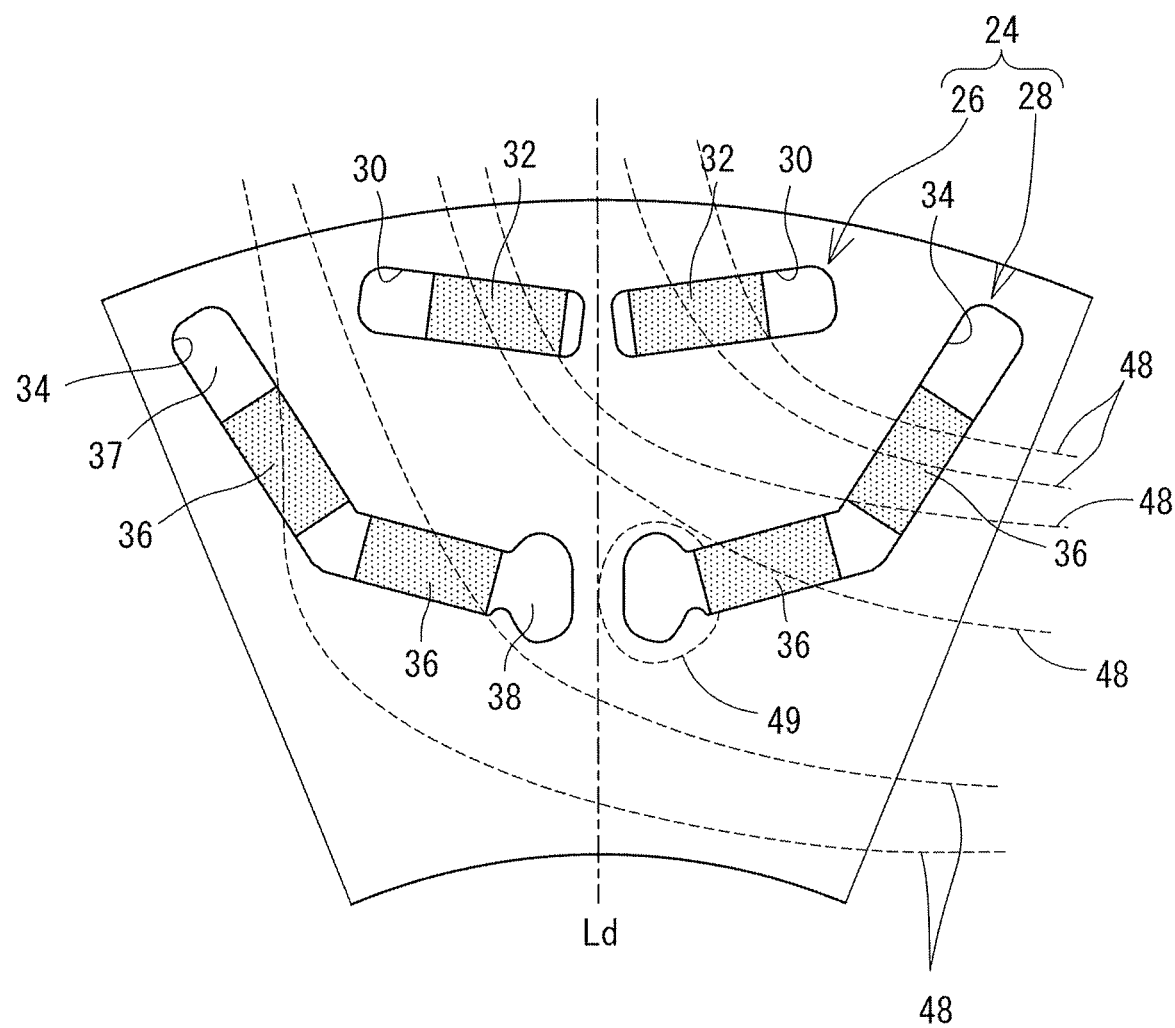
FIG. 5 is a schematic diagram showing a flow of a magnet magnetic flux.

Next, a magnetic flux flowing in the rotor 14 of the present embodiment will be described with reference to FIGS. 4 and 5. FIG. 4 is a schematic diagram showing a primary magnetic flux 46, and FIG. 5 is a schematic diagram showing a magnet magnetic flux 48. As is well-known, the output torque of the permanent magnet synchronous rotary electric machine is a combined toque of a reluctance torque and a magnet torque. The reluctance torque is a torque generated by a force of attraction between a pole due to a rotational magnetic field of the stator 12 and a salient pole of the rotor 14. The reluctance torque is increased as the primary magnetic flux 46 flowing in an approximately circumferential direction around the d axis Ld in the rotor core 22 is increased. The magnet torque is a torque generated by attraction and repulsion between the pole due to the rotational magnetic field of the stator 14 and the magnetic pole 24 of the rotor 14. The magnet torque is increased as the magnet magnetic flux 48 flowing in the rotor core 22 through the magnets 32 and 36 is increased. In the present embodiment, because the two-layer placement is employed for the magnet equipment portions 26 and 28, a total amount of the permanent magnets 32 and 36, and consequently, a total amount of the magnet magnetic flux 48, can be increased in comparison to the case of a one-layer placement. In addition, in the present embodiment, two outer magnets 32 are equipped in one inner magnet hole 34. As a result, a total amount of the permanent magnets 32 and 36, and consequently, the magnet magnetic flux 48, can be increased in comparison to a case where only one inner magnet 36 is equipped in one inner magnet hole 34. With the increase in the magnet magnetic flux 48, the output torque of the rotary electric machine 10 can also be improved.

Here, in the present embodiment, the widths W1, W2, and W3 of the magnetic path between the first magnet equipment portion 26 and the second magnet equipment portion 28 are increased toward the center of the magnetic pole 24 (W1<W2<W3). Specifically, the inclination angles $\theta 2$ and $\theta 3$ of the center-side portion 34c and the outer-side portion 34o with respect to the d axis Ld is set to be smaller than the inclination angle $\theta 1$ of the outer magnet hole 30. With this configuration, local concentration of the primary magnetic flux 46 and the magnet magnetic flux 48 can be reduced, and magnetic saturation can be prevented.

More specifically, as shown in FIG. 4, a part of the primary magnetic flux 46 flowing from the tooth to the rotor 14 flows in an approximately circumferential direction along the magnetic path formed between the first magnet equipment portion 26 and the second magnet equipment portion 28. On the other hand, the magnet magnetic flux 48 flows in a path connecting the inner magnet 36 and the outer magnet 32. The magnet magnetic flux 48 not only flows in an approximately radial direction, but also, a portion thereof flows in an approximately circumferential direction. For example, the magnet magnetic flux 48 exiting from the inner magnet 36 at a right side than the d axis Ld flows to the outer magnet 32 similarly at the right side, and also in the approximately circumferential direction toward the outer magnet 32 at a left side. The amount of magnet magnetic flux 48 flowing in the circumferential direction is increased toward the center of the magnetic pole 24. As a result, near the center of the magnetic pole 24, both the primary magnetic flux 46 and the magnet magnetic flux 48 flow parallel to each other in the circumferential direction, and the magnetic flux density tends to be increased. When the magnetic flux density is excessively increased and is saturated, the reluctance torque and the magnet torque are reduced, resulting in reduction of the output torque of the rotary electric machine 10. In the present embodiment, in order to avoid such magnetic saturation, the width of the magnetic path is increased toward the center of the magnetic pole where the magnetic fluxes tend to be concentrated.

Figure 6:
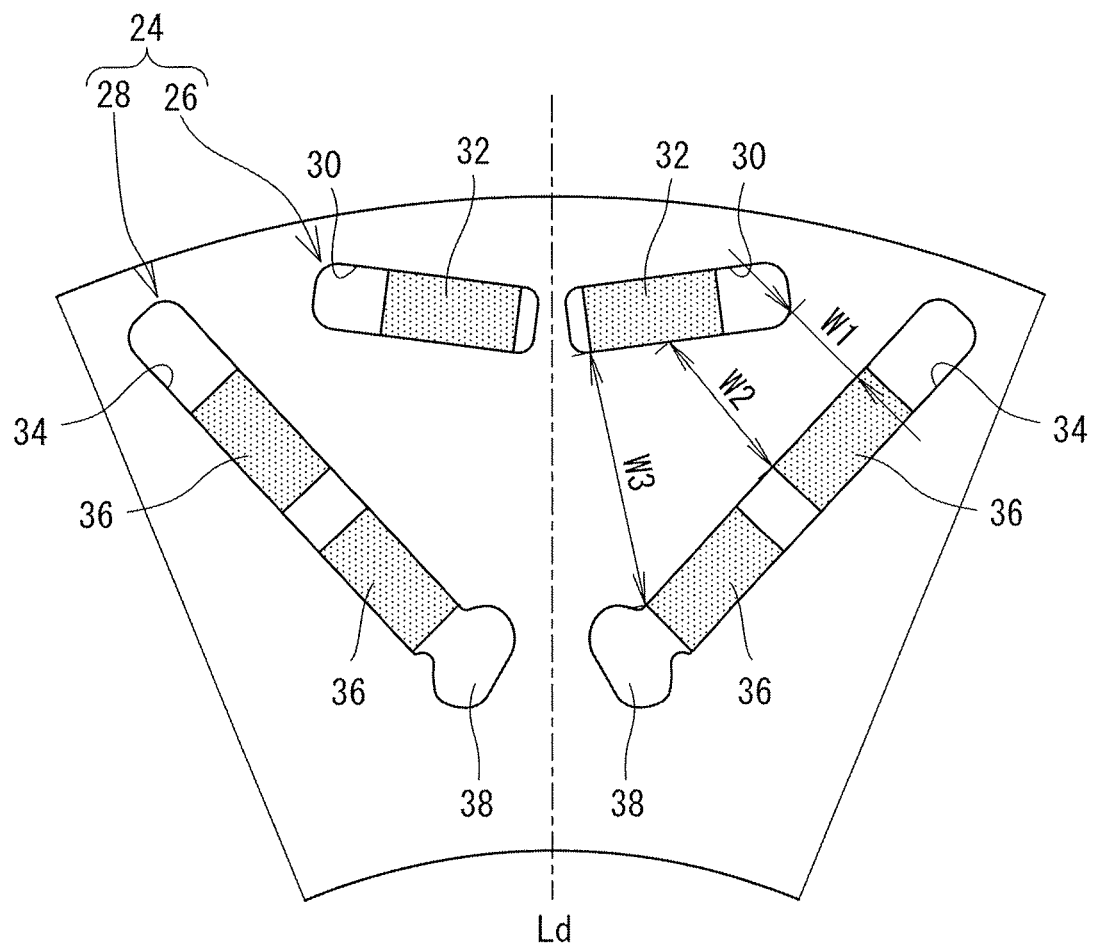
FIG. 6 is a diagram showing a case where a second magnet hole does not have a point of bending.

Here, if the only objective is to increase the widths W1, W2, and W3 of the magnetic path toward the center of the magnetic pole, a configuration may be considered in which the inner magnet hole 34 is not bent and has a straight shape, as shown in FIG. 6. However, when the straight shape is employed for the inner magnet hole 34, the magnetic path width W3 near the center of the magnetic pole becomes excessively large, resulting in reduction of an effective magnet magnetic flux. Specifically, in order to obtain the magnetic torque, the magnet magnetic flux 48 exiting from one magnet 32, 36 must flow toward the other magnet 32, 36. However, when the distance between the magnets is excessively large, the magnetic flux exiting from one magnet 32, 36 tends to not flow toward the other magnet 32, 36, and tends to become a leakage magnetic flux 49 which returns to the one magnet 32, 36.

In the present embodiment, in order to reduce the leakage magnetic flux 49 and increase the effective magnet magnetic flux, the inner magnet hole 34 is bent at a midpoint, and angles are set such that $\theta 2 > \theta 3$. In other words, the center-side portion 34c has an inclination angle closer to that of the outer magnet hole 30 than the outer-side portion 34*o*. By employing such a configuration, it is possible to prevent excessive distancing of the inner magnet 36 from the outer magnet 32 near the center of the magnetic pole. As a result, the distance between the inner magnet 36 and the outer magnet 32 can be maintained at an appropriate distance while avoiding the magnetic saturation, and the magnet torque can be further improved.

Figure 7:
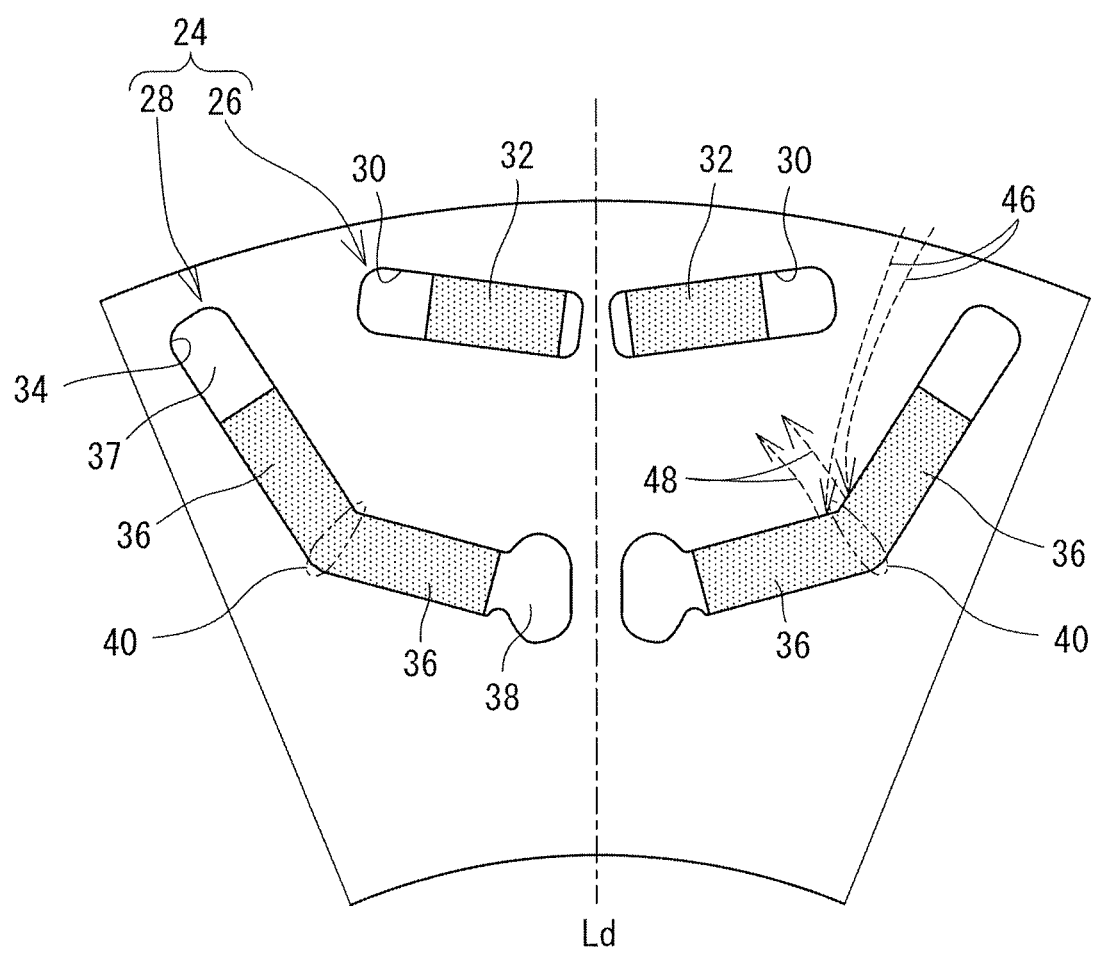
FIG. 7 is a diagram showing a case where an inner magnet which is bent is used.

In order to simply increase the total amount of the magnets 32 and 36, in place of increasing the number of the magnets 32 and 36, a size of one magnet 32, 36 may be increased. For example, as shown in FIG. 7, one large-size inner magnet 36 may be equipped in one outer magnet hole 30. However, in this case, the inner magnet 36 must be set in a shape of the bent line with one or more points of bending 40, corresponding to the shape of the outer magnet hole 30. Such a magnet with the bent line shape has disadvantages that manufacturing of the magnet is complicated, the cost tends to be increased, a counter magnetic field tends to act on the point of bending 40, and utilization efficiency of the magnet magnetic flux 48 is low.

Specifically, from the inner magnet 36, the magnet magnetic flux 48 progressing in the thickness direction thereof extends. A part of the primary magnetic flux 46 flowing along the magnetic path may proceed in an opposite direction from the magnet magnetic flux 48 and may reach the inner magnet 36. The primary magnetic flux 46 of the opposite direction becomes a counter magnetic field which cancels the magnet magnetic flux 48. As shown in FIG. 7, such a primary magnetic flux 46 of the counter magnetic field tends to be particularly concentrated at the point of bending 40 of the inner magnet hole 34. Because of this, if a part of the inner magnet 36 exists at the point of bending 40, the magnet magnetic flux 48 would be cancelled by the counter magnetic field, and the utilization efficiency of the magnet magnetic flux 48 is reduced. However, if a sufficient magnet magnetic flux 48 can be obtained and the problem of the cost can be resolved, the magnet of the bent shape as shown in FIG. 7 may be used as the inner magnet 36.

As described, when a large-size inner magnet 36 extending over the point of bending 40 is used as the inner magnet 36, the influence of the counter magnetic field becomes significant, and the utilization efficiency of the magnet magnetic flux 48 is reduced. On the other hand, in the present embodiment, as described above, the straight-shaped inner magnet 36 is placed on both sides of the point of bending 40. In addition, in the present embodiment, two inner magnets 36 are equipped at positions avoiding the point of bending 40. As a result, the structure tends to not be affected by the counter magnetic field described above, and the utilization efficiency of the magnet magnetic flux 48 exiting the inner magnet 36 can be improved.

As already described, in the present embodiment, the magnetic barrier 38 which is expanded on both sides in the thickness direction and which has a larger thickness than the inner magnet 36 is provided at an end, at the center side of the magnetic pole, of the inner magnet hole 34. With the provision of the magnetic barrier 38, the leakage magnetic flux 49 can be reduced, and the magnet torque can be further improved. Specifically, as shown in FIG. 5, the magnet magnetic flux 48 exiting the inner magnet 36 may become the leakage magnetic flux 49 passing through an inner center bridge 52 and returning to the inner magnet 36. Because the leakage magnetic flux 49 does not contribute to the magnet torque, when the leakage magnetic flux 49 is increased, the magnet torque is correspondingly reduced.

When the magnetic barrier 38 which is expanded on both sides in the thickness direction is provided on the end, on the center side of the magnetic flux, of the inner magnet hole 34, as in the present embodiment, a magnetic path distance of the leakage magnetic flux 49 from the inner magnet 36 through the inner center bridge 52 and returning to the inner magnet 36 is elongated, and the possibility of occurrence of the leakage magnetic flux 49 is reduced. With the efficient reduction of the leakage magnetic flux 49, the magnetic torque, and consequently, the output torque of the rotary electric machine 10, can be further improved.

Figure 8:
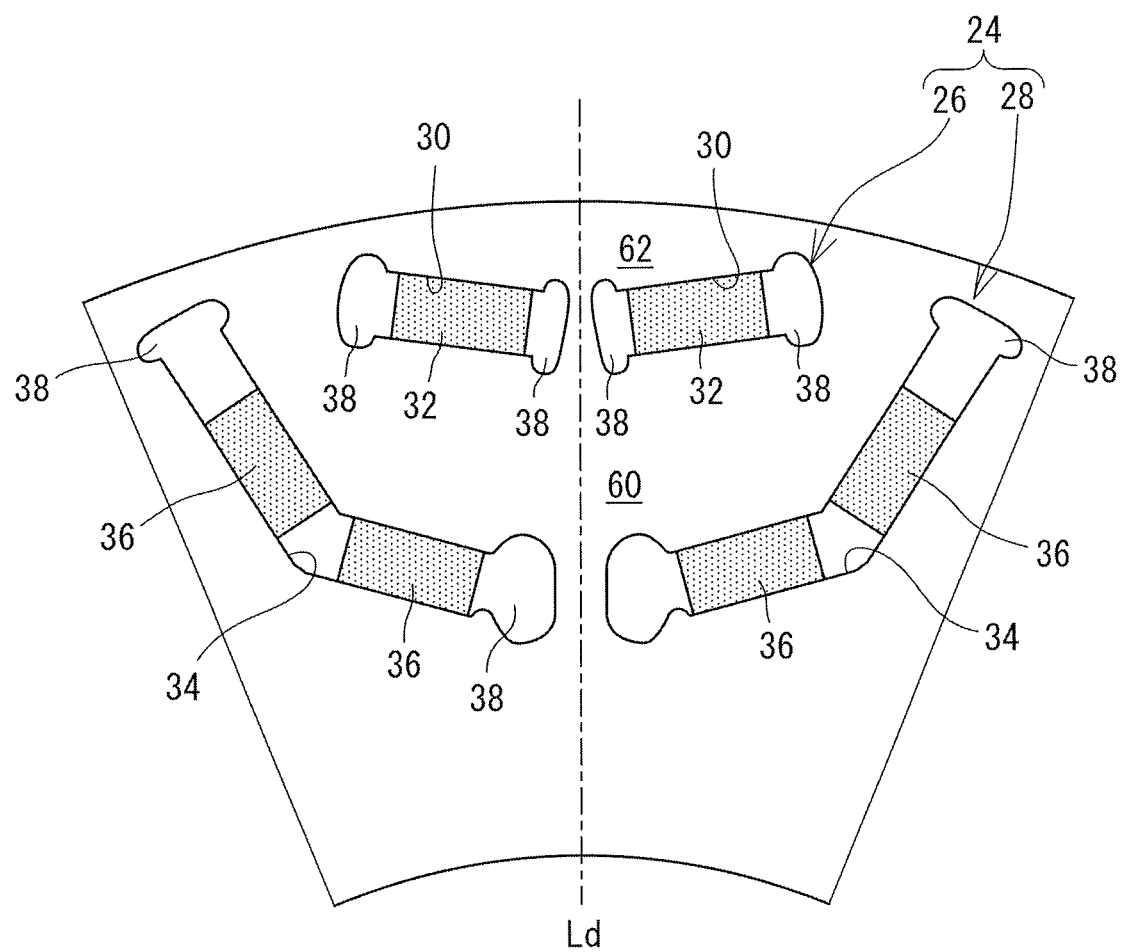
FIG. 8 is a diagram showing a case where a magnetic barrier is provided on both ends of an outer magnet hole and on both ends of an inner magnet hole.

In the present embodiment, the magnetic barrier 38 which is expanded on both sides in the thickness direction is provided only at the end, of the center side of the magnetic pole, of the inner magnet hole 34. The barrier is provided only at this location because adverse magnetic and mechanical influences are not significant. Specifically, in order to reduce the leakage magnetic flux 49, a configuration may be considered as shown in FIG. 8, in which the magnetic barrier 38 which is expanded on both sides in the thickness direction is also provided on both ends of the outer magnet hole 30 and the outer end of the inner magnet hole 34. However, the outer ends of the outer magnet hole 30 and the inner magnet hole 34 are positioned near an outer circumferential edge of the rotor core 22. Because of this, when a large magnetic barrier 38 (space) is provided at the outer ends of the outer magnet hole 30 and the inner magnet hole 34, a mechanical strength of the rotor core 22 may be significantly reduced. In addition, the primary magnetic flux 46 passes not only through a magnetic path 60 between the first and second magnet equipment portions 26 and 28, but also through a magnetic path 62 between the outer circumferential edge of the rotor core 22 and the first magnet equipment portion 26. When the magnetic barrier 38 is also provided at the end of the outer magnet hole 30 and the outer end of the inner magnet hole 34, the magnetic barrier 38 (space) would protrude at locations in the magnetic paths where the width is narrow, such as a region near an entrance of the magnetic path 60 and in the magnetic path 62, resulting in local narrowing of the magnetic paths 60 and 62. In this case, it becomes easier for the primary magnetic flux 46 to be saturated, and the reluctance torque may be reduced.

On the other hand, the magnetic barrier 38 provided at the end, on the center side of the magnetic pole, of the inner magnet hole 34, as in the present embodiment, protrudes near the center of the magnetic pole of the magnetic path 60. Because the region near the center of the magnetic pole of the magnetic path 60 has a sufficiently large width, even if the magnetic barrier 38 (space) protrudes, the adverse magnetic and mechanical influences are not significant. Thus, the magnetic barrier 38 may be provided only at the end, on the center side of the magnetic pole, of the inner magnet hole 34. When the magnetic barrier 38 is provided only at the end, on the center side of the magnetic pole, of the inner magnet hole 34, in order to suppress the leakage magnetic flux near the outer end of the inner magnet hole 34, a size L1 in the width direction (refer to FIG. 4) of the flux barrier 37 provided on the outer end may be set to be larger than a size L2 in the width direction of the magnetic barrier 38. Needless to say, if the adverse magnetic and mechanical influences can be ignored, the magnetic barrier which is expanded on both sides in the thickness direction may also be provided on both ends of the outer magnet hole 30 and the outer end of the inner magnet hole 34, as shown in FIG. 8.

The structure described above is only exemplary, and so long as at least the magnetic barrier 38 which is expanded on both sides in the thickness direction is provided at the end, on the center side of the magnetic pole, of the inner magnet hole 34, the other structures may be suitably changed. For example, the number of magnets equipped in one magnet hole may be suitably changed. For example, two or more outer magnets 32 may be equipped in one outer magnet hole 30. Alternatively, one inner magnet 36 or three or more inner magnets 36 may be equipped in one inner magnet hole 34. Alternatively, the inner magnet hole 34 may have a different shape so long as the inner magnet hole 34 has one or more points of bending 40. For example, the inner magnet hole 34 may have a shape with two points of bending 40.

REFERENCE SIGNS LIST

10 ROTARY ELECTRIC MACHINE; 12 STATOR; 14 ROTOR; 16 ROTATIONAL SHAFT; 18 STATOR CORE; 20 STATOR COIL; 22 ROTOR CORE; 24 MAGNETIC POLE; 26 FIRST MAGNET EQUIPMENT PORTION; 28 SECOND MAGNET EQUIPMENT PORTION; 30 OUTER MAGNET HOLE; 32 OUTER MAGNET; 34 INNER MAGNET HOLE; 34c CENTER-SIDE PORTION; 34o OUTER-SIDE PORTION; 36 INNER MAGNET; 37 FLUX BARRIER; 38 MAGNETIC BARRIER; 40 POINT OF BENDING; 46 PRIMARY MAGNETIC FLUX; 48 MAGNET MAGNETIC FLUX; 49 LEAKAGE MAGNETIC FLUX; 50 OUTER CENTER BRIDGE; 52 INNER CENTER BRIDGE; 60 MAGNETIC PATH; 62 MAGNETIC PATH; G GAP.

The invention claimed is:

1. A rotary electric machine comprising:
   a stator having an approximately circular tube shape; and
   a rotor that is placed at an inner side of and coaxially with the stator, wherein
   the rotor comprises a plurality of magnetic poles aligned in a circumferential direction,
   each magnetic pole includes a first magnet equipment portion and a second magnet equipment portion positioned more toward an inner circumferential side than the first magnet equipment portion,
   the second magnet equipment portion has a pair of inner magnet holes placed symmetrically with respect to a center of the magnetic pole, and one or more inner magnets equipped in each of the inner magnet holes,
   each of the inner magnet holes has a bent line shape with one or more points of bending in an axial direction view,
   the inner magnet is equipped at a position distanced from all of the points of bending,
   an end, on a center side in a circumferential direction of the magnetic pole, of at least one of the inner magnet holes is expanded on both sides in a thickness direction thereof, and functions as a magnetic barrier having a larger thickness than the inner magnet, and
   the first magnet equipment portion includes one or more outer magnet holes.

2. The rotary electric machine according to claim 1, wherein
   a width of a magnetic path between the first magnet equipment portion and the second magnet equipment portion is widened from an end thereof toward the center of the magnetic pole.

3. The rotary electric machine according to claim 2, wherein
   the inner magnet hole has a center-side portion which is at a side nearer to the center of the magnetic pole than the point of bending, and an outer-side portion which is more toward an outer side than the point of bending, and
   an inclination angle between the center-side portion and a d axis is larger than an inclination angle between the outer-side portion and the d axis.

4. The rotary electric machine according to claim 1, wherein
   the inner magnet is equipped on both sides of the point of bending in the inner magnet hole.

5. The rotary electric machine according to claim 1, wherein
   one or more outer magnets is equipped in each of the outer magnet holes, and
   all of the outer magnets and the inner magnets have the same shape.

\* \* \* \* \*